(12) United States Patent
Grizzle et al.

(10) Patent No.: US 11,912,437 B2
(45) Date of Patent: Feb. 27, 2024

(54) UNIVERSAL PAYLOAD MANIPULATION TOOL WITH TELESCOPING RING SEGMENT

(71) Applicant: Raytheon Company, Tewksbury, MA (US)

(72) Inventors: James B. Grizzle, Oro Valley, AZ (US); Tanner P. Reznicek, Aurora, CO (US); Cory M. Polivchak, Tucson, AZ (US)

(73) Assignee: Raytheon Company, Tewksbury, MA (US)

( * ) Notice: Subject to any disclaimer, the term of this patent is extended or adjusted under 35 U.S.C. 154(b) by 676 days.

(21) Appl. No.: 17/089,475

(22) Filed: Nov. 4, 2020

(65) Prior Publication Data

US 2022/0135250 A1 May 5, 2022

(51) Int. Cl.
 *B64F 1/32* (2006.01)
 *B66F 9/16* (2006.01)
 *B66F 9/18* (2006.01)

(52) U.S. Cl.
 CPC .................. *B64F 1/32* (2013.01); *B66F 9/16* (2013.01); *B66F 9/184* (2013.01)

(58) Field of Classification Search
 CPC ........... B23K 37/0452; B23K 37/0538; B23Q 1/525; B23Q 1/527; B23Q 1/763; B64F 5/50; B66F 9/18; B66F 9/184; Y10T 82/2593; Y10T 82/2597
 See application file for complete search history.

(56) References Cited

U.S. PATENT DOCUMENTS

| | | | |
|---|---|---|---|
| 2,937,839 A | 5/1960 | Randolph |
| 3,067,884 A | 12/1962 | Williams |
| 4,447,186 A | 5/1984 | Renfro et al. |
| 4,623,295 A | 11/1986 | Foss et al. |
| 5,915,290 A | 6/1999 | Coleman et al. |
| 6,668,950 B2 | 12/2003 | Park |
| 7,103,952 B2 | 9/2006 | Appleton et al. |
| 7,596,843 B2 | 10/2009 | Spishak et al. |

(Continued)

FOREIGN PATENT DOCUMENTS

| | | |
|---|---|---|
| CN | 107458621 A | 12/2017 |
| EP | 1092671 A2 | 4/2001 |

*Primary Examiner* — Tyrone V Hall, Jr.
(74) *Attorney, Agent, or Firm* — Schwegman Lundberg & Woessner, P.A.

(57) ABSTRACT

A universal payload manipulation tool employs a segmented ring captured in a telescoping cradle to perform the positioning functions of both a workstation and a loading adapter. The ring rotates over a range of 360 degrees to perform the position functions of the workstation. With the upper ring segment removed, the telescoping cradle rotates and the lower ring segment rotates and extends from the telescoping cradle over a combined range of rotation to position the payload at a specified angle for unloading to perform the position functions of a loading adapter. This configuration allows the universal tool to access confined spaces while supporting a range of rotation required in many applications for unloading the payload (loading the payload to another platform such as an aircraft). The manipulation tool may also be configured as only a loading adapter.

20 Claims, 12 Drawing Sheets

(56) References Cited

U.S. PATENT DOCUMENTS

| | | | |
|---|---|---|---|
| 8,366,360 B2 * | 2/2013 | Krogh | F03D 13/40 |
| | | | 410/44 |
| 8,602,713 B1 | 12/2013 | Davis et al. | |
| 9,540,017 B2 | 1/2017 | Huelsmann et al. | |
| 9,843,288 B2 | 12/2017 | Chaintreuil et al. | |
| 10,377,288 B2 | 8/2019 | Davis | |
| 2019/0202011 A1 * | 7/2019 | Watkins | B23K 37/047 |

* cited by examiner

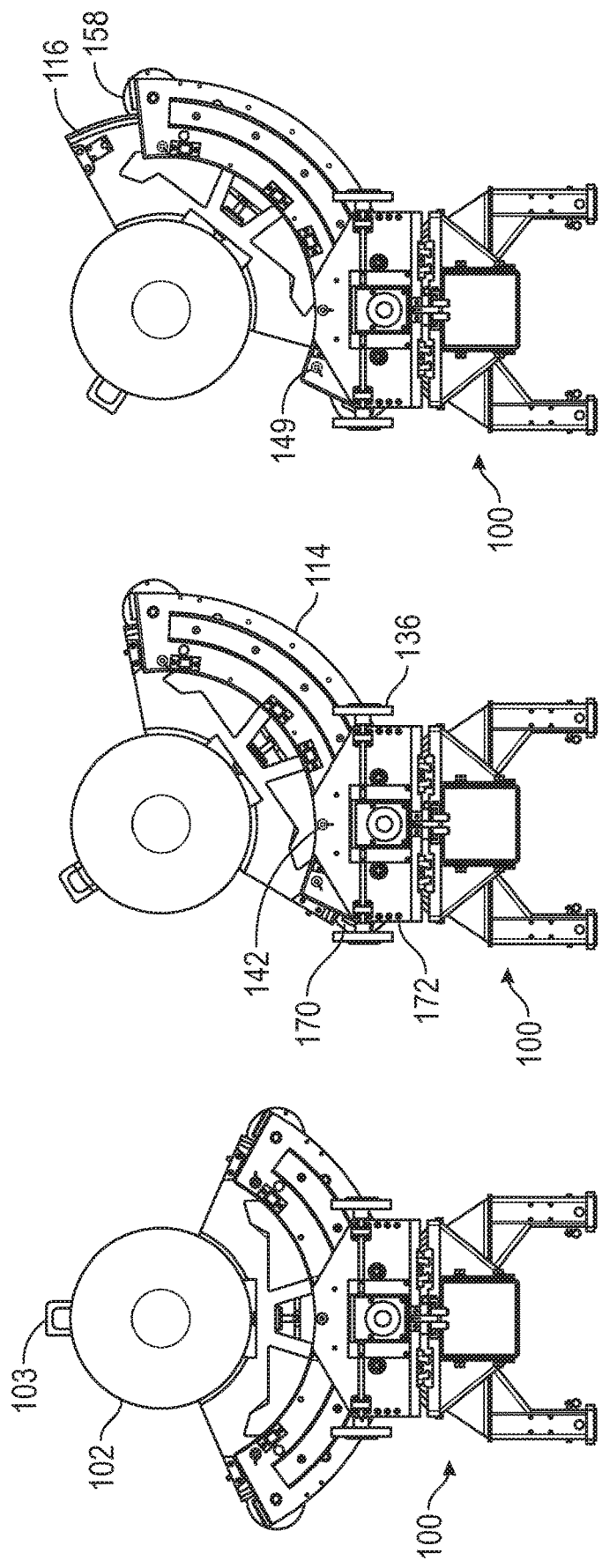

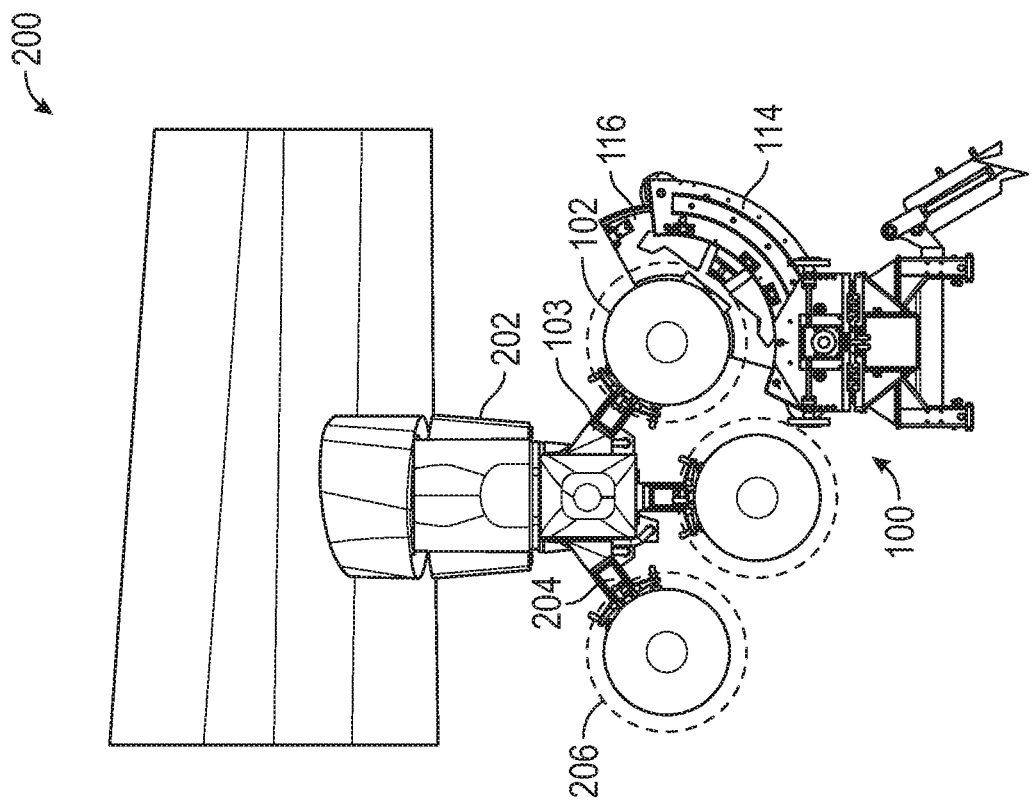
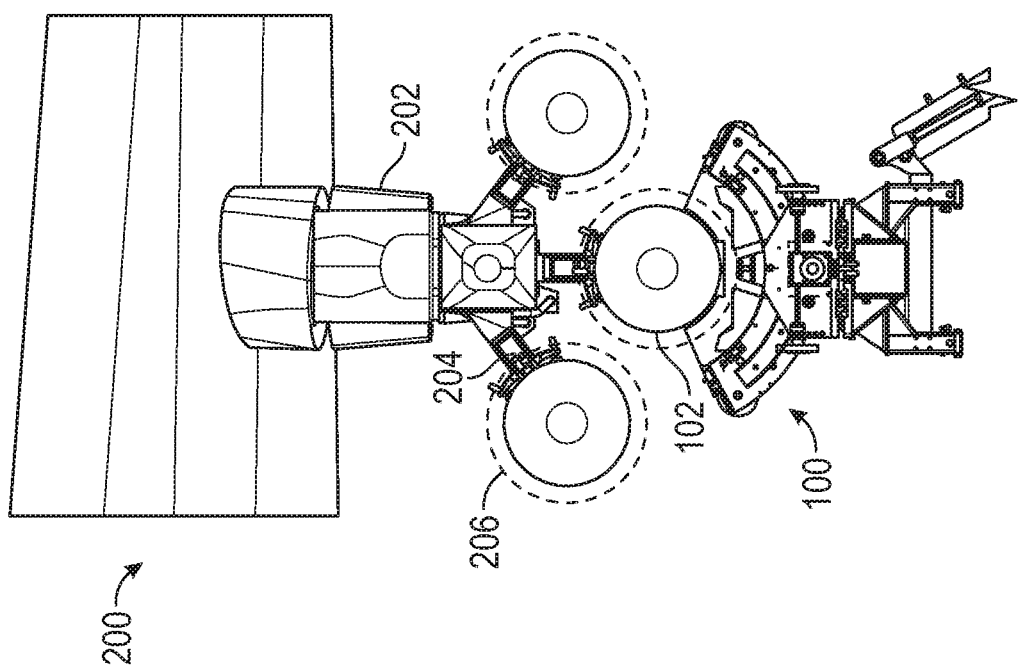

UNIVERSAL PAYLOAD MANIPULATION TOOL WITH TELESCOPING RING SEGMENT

GOVERNMENT LICENSE RIGHTS

This invention was made with government support. The government has certain rights in this invention.

BACKGROUND OF THE INVENTION

Field of the Invention

This invention relates to workstations for mounting and positioning payloads such as military "stores" for assembly, test, maintenance and repair and loading adaptors for loading such payloads onto a platform such as an aircraft, and more particularly to a universal payload manipulation tool that performs the positioning functions of both the workstation and the loading adapter. The manipulation tool may also be configured as only a loading adapter with an extended rotational range.

Description of the Related Art

In an industrial manufacturing facility, large-scale hardware or "payload", such as a "store" (e.g., a missile) weighing up to 8,000 pounds or more and extending approximately 24 feet long or so, is assembled, tested, maintained or repaired, together referred to as "tasks", on workstations. These workstations may comprise a stationary lifting beam or rail provided with mounting brackets fore and aft or a stationary pair of pedestals. A more ergonomic workstation may have cradles positioned fore and aft of a stationary rail as shown in FIGS. 13A and 13B of U.S. Pat. No. 9,834,228 entitled "Apparatus for Automated Transfer of Large-Scale Missile Hardware." A hardware ring coupled to the cradle includes an interface configured to hold a missile. A user manually rotates the hardware ring and missile to a desired position to perform one or more tasks. The store can be moved around within the facility by either using a lifting truck commonly referred to as a "Jammer" to lift the entire workstation and store or via an automated transfer system as described in the aforementioned patent.

Once all of the tasks are completed at the manufacturing facility, the store is lifted from the workstation and placed in a dedicated shipping container that is shipped to an air base where it is removed from the container with a special lift hoist and crane then placed onto a lifting beam. Testing or maintenance may be performed on the store.

Typically, multiple stores are loaded onto a common mount under the wing of an aircraft in close proximity at precisely defined angles. Given the size and weight of the store, the store must be rotated to the prescribed angle and lifted to engage the common mount. The adjacent mounted stores define "keep out" regions that neither the store being loaded or the loading mechanism may violate.

As shown in FIG. 1 to load such a store 10 a "Positioner" 12 is attached to an "Effector" (rotating mechanical mount) 14 on the front end of a Jammer 16. The Jammer slides the Positioner under and lifts the lifting beam 18 and the store 10. A user hand cranks a lead screw that actuates a lifting surface 20 to tilt the entire assembly by the prescribed angle to align a mount 22 to a mount under the wing of the aircraft. The Jammer lifts the assembly into place where the store mount is aligned and attached to the aircraft's common mount. The Positioner is a large piece of equipment used only for loading that occupies considerable valuable space at the air base. The Positioner can only tilt the assembly in one direction. Furthermore the Positioner has proven to be dangerous to the airmen when handling such large and heavy payloads.

U.S. Pat. No. 4,623,295 entitled "One-Step Loading Adapter" is attached to a lifting truck. The adapter is able to transport and position a store such as a missile from a storage location to an aircraft wing for mounting thereto without transfer to another device. The adapter has a removable boom assembly for lifting and lowering the store as desired. An adjustable cradle having three degrees of freedom is able to position the store for mounting once the store is loaded thereon. The store may be moved fore and aft or laterally via cradle trolleys and rotated within the cradle.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a universal tool for payload manipulation that performs the positioning functions of both a workstation and a loading adapter. The manipulation tool may also be configured as only a loading adapter with an extended rotational range to provide requisite loading angles in confined spaces.

In an embodiment, a universal tool comprises first and second telescoping cradle assemblies positioned fore and aft on a lifting beam. Each telescoping cradle assembly comprising a telescoping cradle rotationally coupled to the lifting beam, a lower ring segment captured in the telescoping cradle, a payload mount on the lower ring segment; and a detachable upper ring segment. In a first state a complete ring formed by attachment of the upper ring segment to the lower ring segment rotates to different positions over a first range of rotation of 360 degrees to perform the positioning functions of a workstation. In a second state the telescoping cradle rotates and the lower ring segment rotates and extends from the telescoping cradle (in either order) over a combined range of rotation to position the payload at a specified angle for unloading to perform the position functions of a loading adapter. This configuration allows the universal tool to access confined spaces while supporting a range of rotation required in many applications for unloading the payload (loading the payload to another platform such as an aircraft).

In an embodiment, the universal tool includes a telescoping cradle locking mechanism for locking the telescoping cradle to prevent rotation and a lower ring segment locking mechanism for locking the lower ring segment to the telescoping cradle. In the first state, the lower ring segment locking mechanism is disengaged to allow the complete ring to fully rotate. Although not required, the telescoping cradle locking mechanism is preferably engaged as well. In the second state, once the telescoping cradle and lower ring segment are rotated and extended to a specified angle the telescoping cradle locking mechanism and lower ring segment locking mechanism are engaged to hold the payload for loading.

In an embodiment, the universal tool includes a first drive mechanism configured to rotate the complete ring and payload mount over the first range of rotation 360 degrees in the first state, a second drive mechanism configured to rotate the telescoping cradle over a second range of rotation in the second state and a third drive mechanism configured to rotate and extend the lower ring segment with respect to the telescoping cradle over a third range of rotation. The second and third drive mechanisms together rotate the lower ring segment and the payload mount over the combined range of rotation that exceeds each of the second and third ranges of rotation (the second and third ranges of rotation limited by width requirements on the tool to access confined spaces). In an embodiment, the first and third drive mechanisms are a common drive mechanism.

In an embodiment, a method comprises mounting a payload onto a universal tool comprising first and second telescoping cradle assemblies positioned fore and aft of a lifting beam, each said telescoping cradle assembly comprising a lower ring segment captured in a telescoping cradle rotational coupled to the lift beam and a payload mount on the lower ring segment. To perform a task on the payload, the method attaches an upper ring segment to the lower ring segment to form a complete ring and rotates the payload to a desired position over a range of rotation of 360 degrees. To unload the payload from the universal tool, the method detaches the upper ring segment and rotates the telescoping cradle and rotating and extending the lower ring segment from the telescoping cradle to a specified angle over a combined range of rotation.

In another embodiment, a loading tool comprises first and second telescoping cradle assemblies positioned fore and aft on a lifting beam. Each telescoping cradle assembly comprises a telescoping cradle rotationally coupled to the lifting beam, a lower ring segment captured in the telescoping cradle and a payload mount on the lower ring segment. One or more drive mechanisms are configured to rotate the telescoping cradle and rotate and extend the lower ring segment from the telescoping cradle to a specified angle over a combined range of rotation. A locking mechanism is configured to fix the angle of rotation at the specified angle for unloading the payload.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 5A through 5C illustrate rotation of the payload to a specified angle for unloading the payload by rotating the telescoping cradle and rotating and extending the lower ring segment from the telescoping cradle over a combined range of rotation;

FIGS. 6A and 6B illustrate use of the universal tool to load the store under the wing of an aircraft with defined "keep out" regions that constrain the width of the tool.

DETAILED DESCRIPTION OF THE INVENTION

The present invention provides a universal payload manipulation tool in which a segmented ring captured in a telescoping cradle performs the positioning functions of both a workstation and a loading adapter. The ring rotates over a range of 360 degrees to perform the position functions of the workstation. With the upper ring segment removed, the telescoping cradle rotates and the lower ring segment rotates and extends from the telescoping cradle over a combined range of rotation to position the payload at a specified angle for unloading to perform the position functions of a loading adapter. This configuration allows the universal tool to access confined spaces while supporting a range of rotation required in many applications for unloading the payload (loading the payload to another platform such as an aircraft). The manipulation tool may also be configured as only a loading adapter that can provide an extended range of rotation in confined spaces.

Without loss of generality, the Universal Tool will be described in the context of a payload that is a store such as a large missile on which various "tasks" such as assembly, testing, maintenance and repair are performed and then unloaded from the tool and loaded onto a mount under a wing of an aircraft. It will be understood that such a Universal Tool could be used to perform similar tasks on, for example, a payload such as an external fuel tank that is loaded onto an aircraft or for other industrial hardware for which similar "tasks" are required and positioning to load and unload the hardware within the industrial facility.

Figure 2:
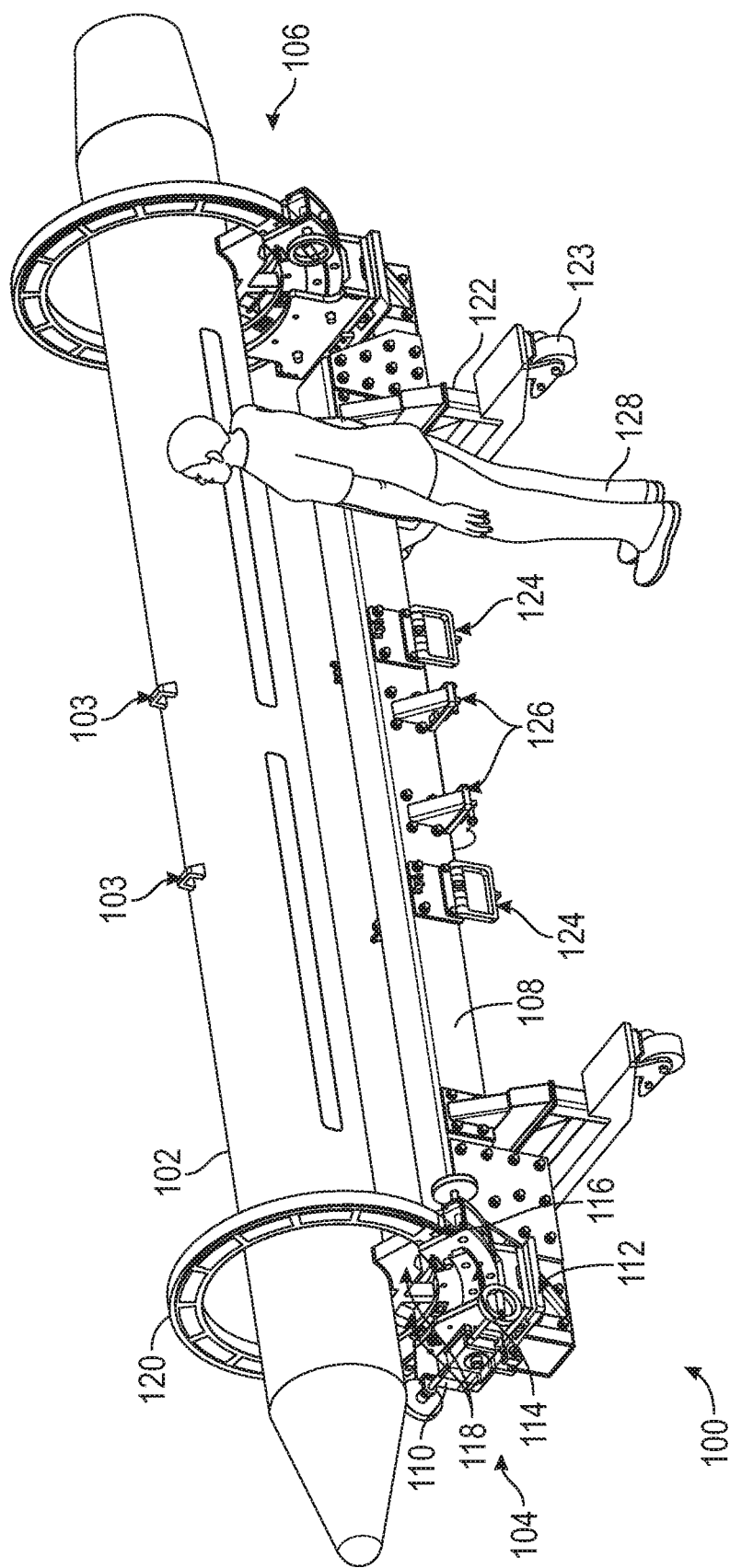
FIG. 2 is a view of an embodiment of a Universal Tool that can rotate a store over 360 degrees to perform tasks such as assembly, test, maintenance and repair on a store and can rotate a store to a specified angle over a lesser range to load the store under a wing of an aircraft.

Referring now to FIG. 2, an embodiment of a universal tool 100 for rotational manipulation of a payload 102 with payload lugs 103 comprises first and second telescoping cradle assemblies 104 and 106 positioned fore and aft on a lifting beam 108. Each telescoping cradle assembly comprises a lower cradle 110 mounted on lifting beam 108. The lower cradle 110 can be slightly adjusted fore and aft via cradle assembly adjustment mechanism 112. A telescoping cradle 114 is rotationally captured in the lower cradle and forms a portion of a circular ring. A lower ring segment 116 is captured in the telescoping cradle and provided with a payload mount 118. When lower ring segment 116 is centered with respect to telescoping cradle 114 the ends of the lower ring segment suitably protrude just enough to attach upper ring segment 120. A detachable upper ring segment 120 forms a complete ring when attached to lower ring segment 116. The tool is suitably provided with adjustable height support legs 122 that may be provided with wheels. Forklift pockets 124 and jammer attachment points 126 are provided to engage a standard forklift or jammer.

To perform a task on the payload 102, after the payload is mounted in the tool, a user 128 attaches upper ring segment 120 to the lower ring segment 116 to form a complete ring. The user rotates payload 102 to a desired position over a range of rotation of 360 degrees and performs the task. This can be repeated as necessary to perform different tasks. To unload the payload from the universal tool (and load the payload to another platform such as an aircraft), the user detaches upper ring segment 120, rotates the telescoping cradle 114, suitably to its maximum rotation, then rotates and extends the lower ring segment 116 from the telescoping cradle 114 up to its maximum rotation to a specified angle within a combined range of rotation. Alternately, the user could first rotate and extend the lower ring segment 116 from the telescoping cradle 114 to its maximum rotation and then rotate the telescoping cradle to achieve the specified angle. A locking mechanism is used to fix the angle of rotation at the specified angle for unloading the payload. In some, cases the payload can be unloaded at zero degrees of rotation of the telescoping cradle and lower ring segment.

Figure 3A:
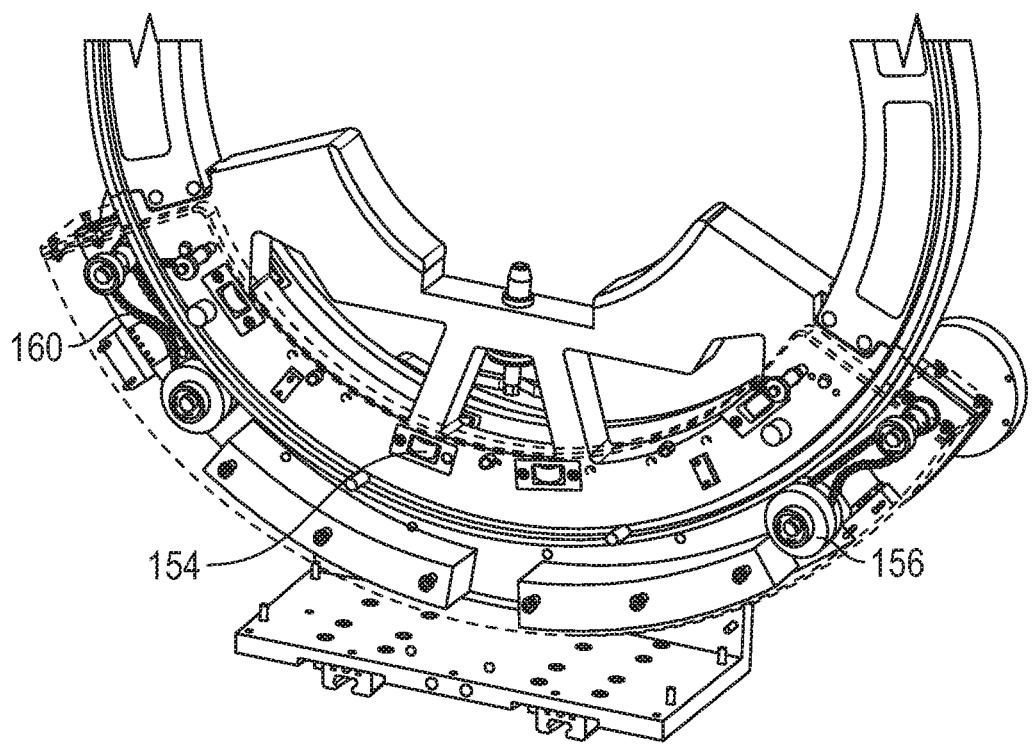
FIGS. 3A through 3C illustrate the assembly of an embodiment of a telescoping cradle assembly.
Figure 3B:
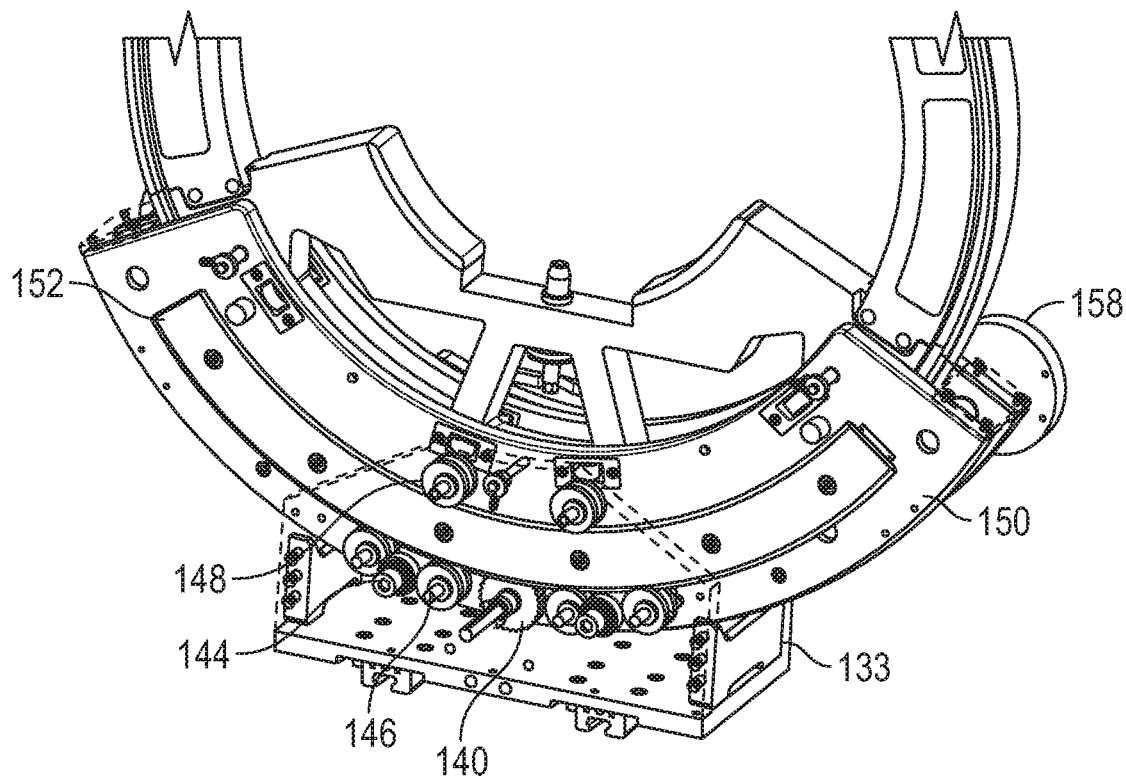
Figure 3C:
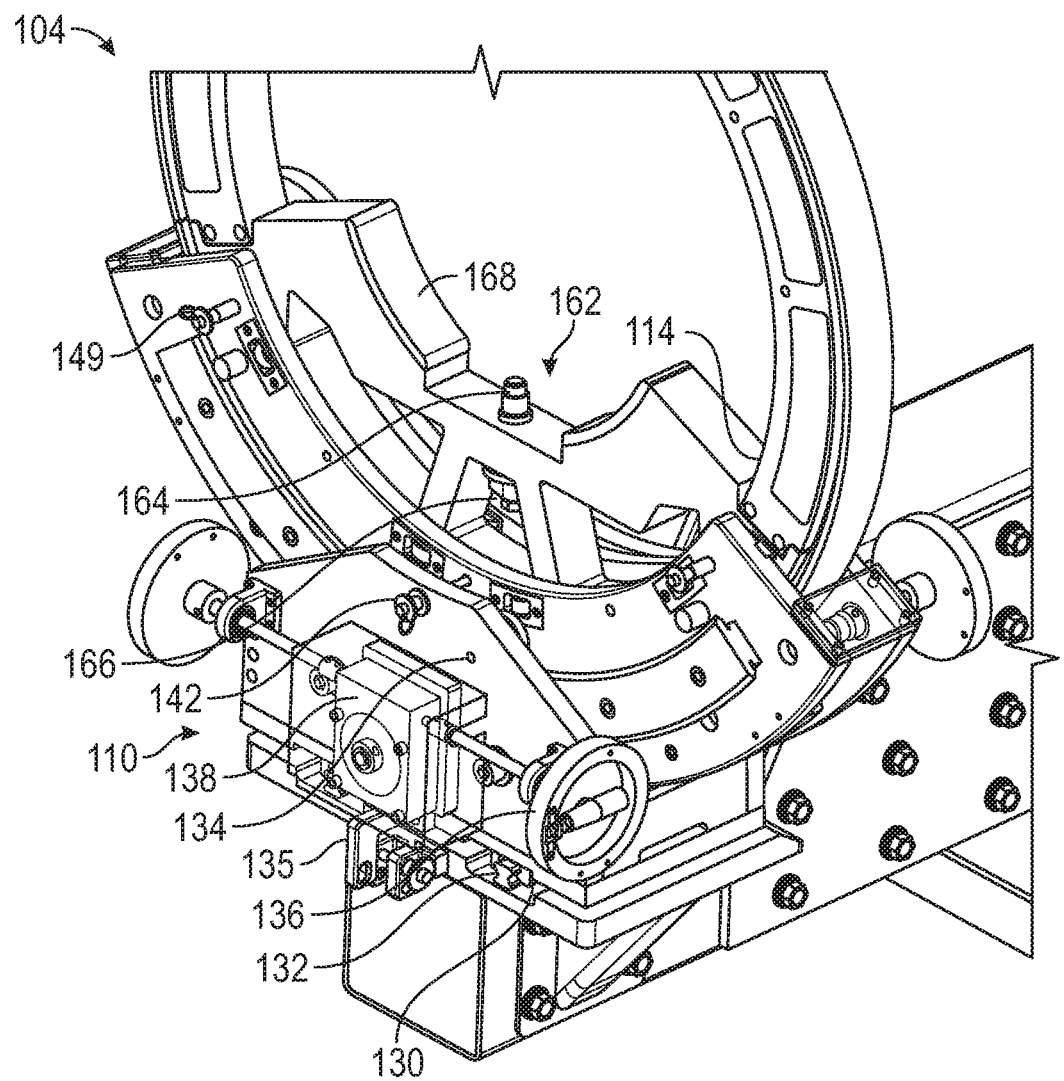

Referring now to FIGS. 3A through 3C, in an embodiment of telescoping cradle assembly 104, lower cradle 110 includes a mounting bracket and carriage 130 that engages linear sliding rails 132 on the lifting beam to provide for adjustment fore and aft, a front plate 134 and a back plate 133. A fore-aft cradle lock 135 locks the telescoping cradle assembly in place. A hand wheel 136 is coupled through a gear reduction 138 to a pinion drive gear 140 that rotates telescoping cradle 114. A quick release pin 142 provides a locking mechanism for telescoping cradle 114. A number of fixed V-rollers 146 are attached to pivot 144 and eccentric V-rollers 148 are mounted on the front plate 134 and on the back plate 133 to support the load of the telescoping cradle 114. A quick release pin 149 provides a locking mechanism for the lower ring segment 116.

Telescoping cradle 114 includes a U-shaped channel 150 that forms a segment of a ring. A V-roller guide 152 on the front and back (not shown) surface of U-shaped channel 150 is supported on the V-rollers 144, 146 and 148 and driven by pinion drive gear 140. Guide rollers 154 and urethane drive rollers 156 are mounted inside U-shaped channel 150 to support and drive the upper and lower ring segments 120 and 116. A hand wheel 158 is coupled through a chain drive 160 to the urethane drive rollers 156.

Lower ring segment 116 is provided with a payload mount 162 that includes a pilot pin 164 and a captive bolt 166 for securing the store in the lower ring segment and replaceable wear pads 168. Payload mount 162 and wear pads 168 can have various configurations to receive and securely hold stores having different cross-sections.

Figure 4A:
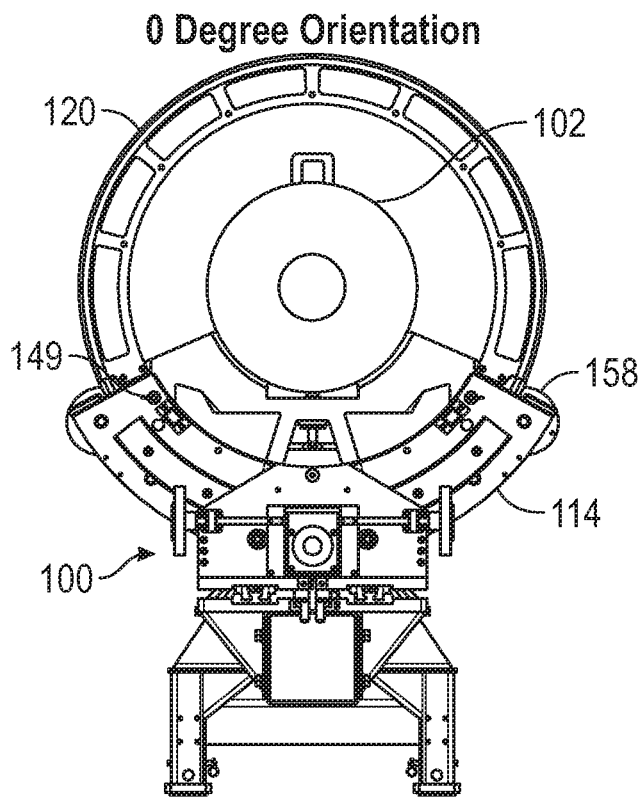
FIGS. 4A and 4B illustrate 360 degrees of rotation of the payload via a complete ring formed by attaching an upper ring segment to a lower ring segment that rotates in a telescoping cradle.
Figure 4B:
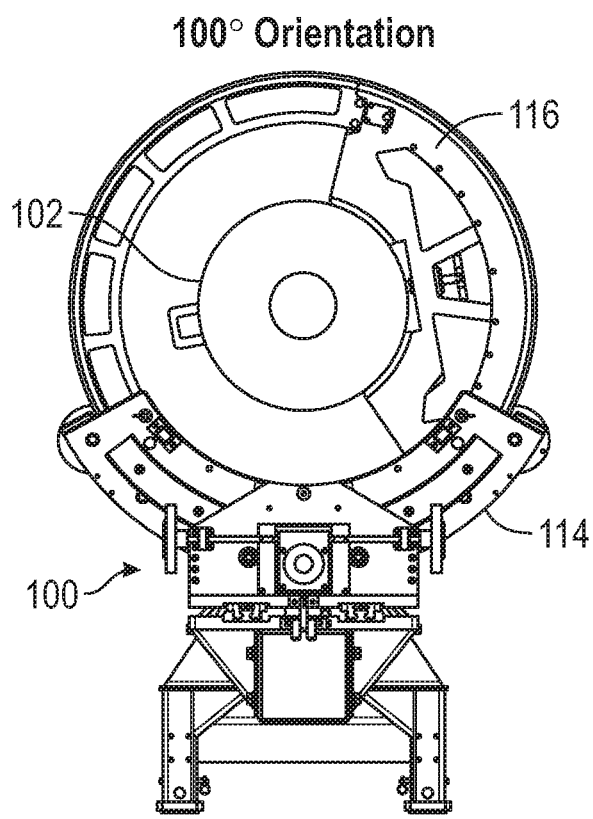

Referring now to FIGS. 4A-4B, to perform a "task" payload 102 is mounted onto the Universal Tool 100 and upper ring segment 120 is attached to lower ring segment 116 to form a complete ring. Although not required, quick release pin 142 is preferably engaged to lock telescoping cradle 114 in place, typically at 0 degrees of rotation although that is not required. Quick release pin 149 is disengaged to allow the ring to roll. The user cranks hand wheel 158 that rotates the urethane drive rollers to rotate the ring to a desired position e.g. 1000 over a range of rotation of 360°.

Referring now to FIGS. 5A-5C, to unload payload 102 from the Universal Tool 100 and load the payload onto another platform that requires a specific orientation of the payload 102 and its payload lugs 103, the telescoping cradle 114 and lower ring segment 116 are suitably returned to 0 degrees of rotation and the upper ring segment 120 is detached. The telescoping cradle 114 and the lower ring segment 116 each have a range of rotation.

To satisfy certain access restrictions of the platform, the Universal Tool at 0 degrees of rotation can only be so wide, W<specified value. To satisfy this constraint, the telescoping cradle and the lower ring segment must also satisfy this constraint. This inherently limits the range of rotation that can be achieved by either the telescoping cradle or the lower ring segment individually. In many applications, the orientation required to unload (or load) the payload exceeds either range. Furthermore, the assembly is preferably configured such that when the telescoping cradle 114 reaches the maximum extent of its range of rotation, the trailing end 170 of the telescoping cradle 114 (and lower ring segment 116) reach or clear the edge 172 of the lower cradle 110. This allows the universal tool to rotate the payload to a desired orientation on one side of the tool and then be positioned in confined spaces adjacent a portion of the platform on the other side of the tool to unload the payload.

To reach an angle outside either range, quick release pin 142 is disengaged to unlock telescoping cradle 114. The user cranks hand wheel 136 that rotates the pinon drive gear to rotate telescoping cradle 114 to the extent of its range. Quick release pin 142 is engaged to fix the position of telescoping cradle 114. Quick release pin 149 is disengaged and the user cranks hand wheel 158 that rotates the urethane drive rollers to rotate and extend lower ring segment 116 to a desired position (e.g., 50 degrees) at which point quick release pin 149 is engaged to hold the payload at the desired orientation. Alternately, the lower ring segment 114 be rotated and extended to the extent of its range and then the telescoping cradle 114 can be rotated to the desired orientation.

To ensure mechanical stability when handling payloads up to 4,000 pounds, the universal tool must maintain an adequate interface between the lower ring segment 116 and the telescoping cradle 114 when fully extended and between the telescoping cradle 114 and the lower cradle 110 when fully extended. As shown in FIG. 5B, when fully extended at least 35% of the telescoping cradle 114 remains engaged with the lower cradle 110. As shown in FIG. 5C, when fully extended at least 60% of the lower ring segment 116 remains engaged with the telescoping cradle.

For the specific case and embodiment, of loading a store under the wing of an aircraft, range of rotation of the telescoping cradle 114 is approximately +/−38 degrees, the range of rotation and extension of the lower ring segment 116 is approximately +/−22 degrees, and the combined range of rotation is approximately +/−60 degrees. As used herein, "approximately" is +/−5 degrees. For a more generic payload to a platform the telescoping design may support larger ranges of rotation in which the range of rotation and extension of the telescoping cradle 114 is +/−50 degrees, the range of rotation of the lower ring segment 116 is +/−40 degrees, and the combined range of rotation is +/−90 degrees.

Referring now to FIGS. 6A and 6B, in an exemplary embodiment the Universal Tool 100 is used to load payload 102 in the form of a military store such as a missile under a wing 200 of an aircraft. Wing 200 has a common mount 202 with multiple individual mounts 204 positioned at varying angles e.g., −50 degrees, 0 degrees and +50 degrees. As shown in FIG. 6A, stores 102 are mounted under the wing at the plus and minus 50 degrees positions. Each store has a keep out region 206 around it that must be enforced, neither the Universal Tool nor the store to be loaded may cross into the keep out region 206. As shown, if the Universal Tool, and specifically either the telescoping cradle 114 or lower ring segment 116 were wide enough to service the required range of rotation on their own, the Universal Tool would encroach on keep out region 206. As shown in FIG. 6B, the Universal Tool has to rotate the store 102 plus 50 degrees to align its payload lugs 103 to the individual mount 204 under the wing. This orientation exceeds the maximum range of either the telescoping cradle or lower ring segment when constrained by the keep out region. Furthermore, at 50 degrees of rotation the telescoping cradle 114 has rotated to the maximum extent of its range such that the trailing end of the telescoping cradle 114 and lower ring segment 116 have cleared the edge of the lower cradle. As a result, the universal tool can be positioned adjacent the center store to enable loading of store 102 under the wing.

Figure 1:
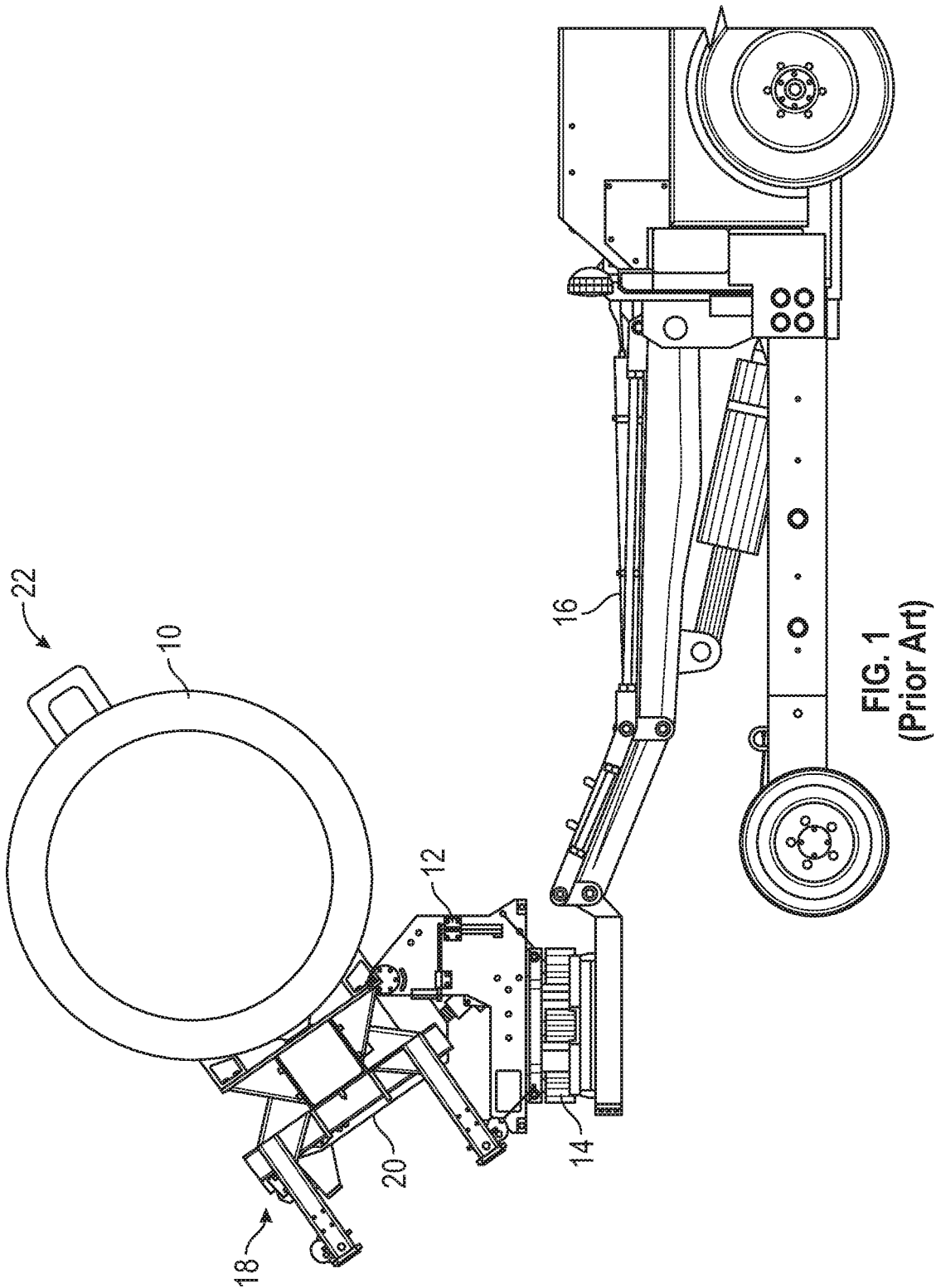
FIG. 1, as described above, is an illustration of the use of a jammer and positioner to lift and tilt a workstation and store to load the store under a wing of an aircraft.
Figure 7A:
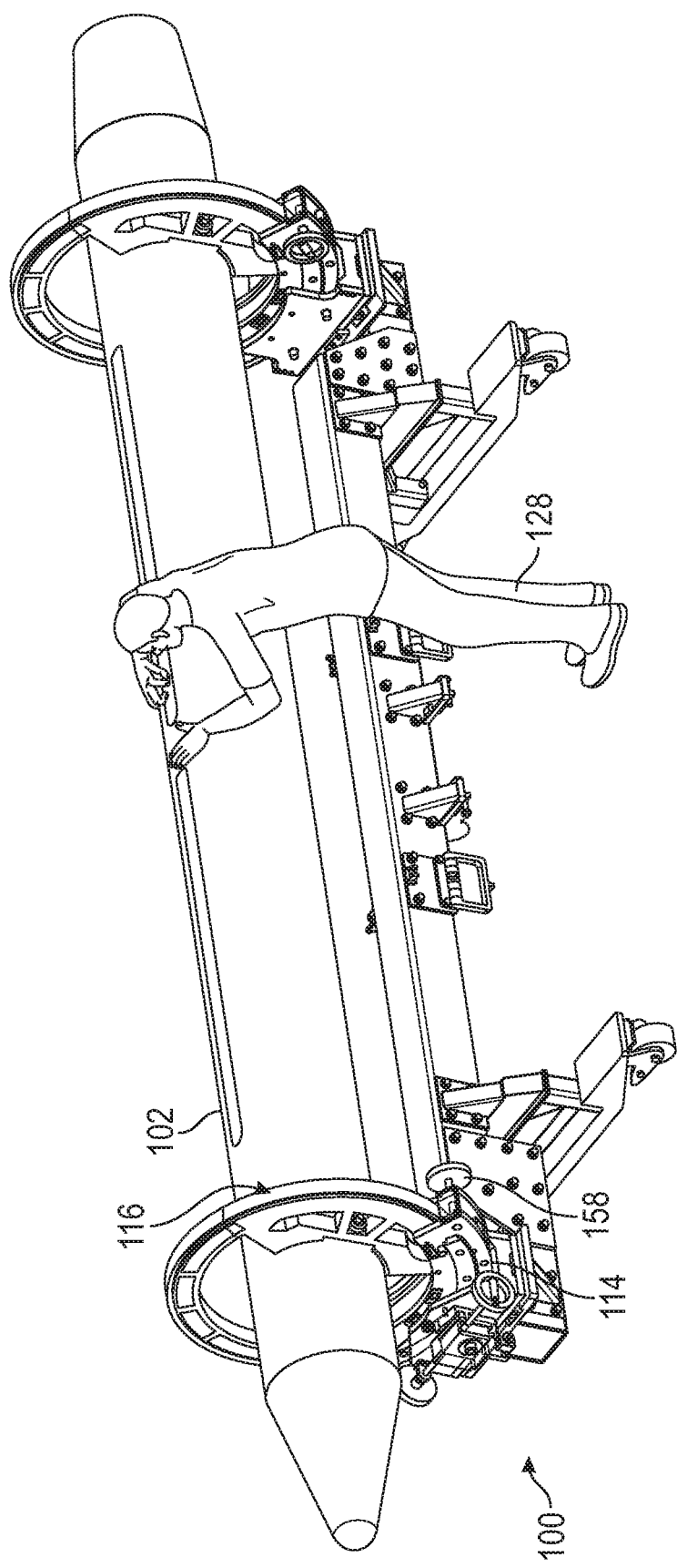
FIGS. 7A through 7E illustrate a sequence of operations using the universal tool to first position the store for performance of a task and then to position the store at a specified angle to load the store under the wing of an aircraft.
Figure 7B:
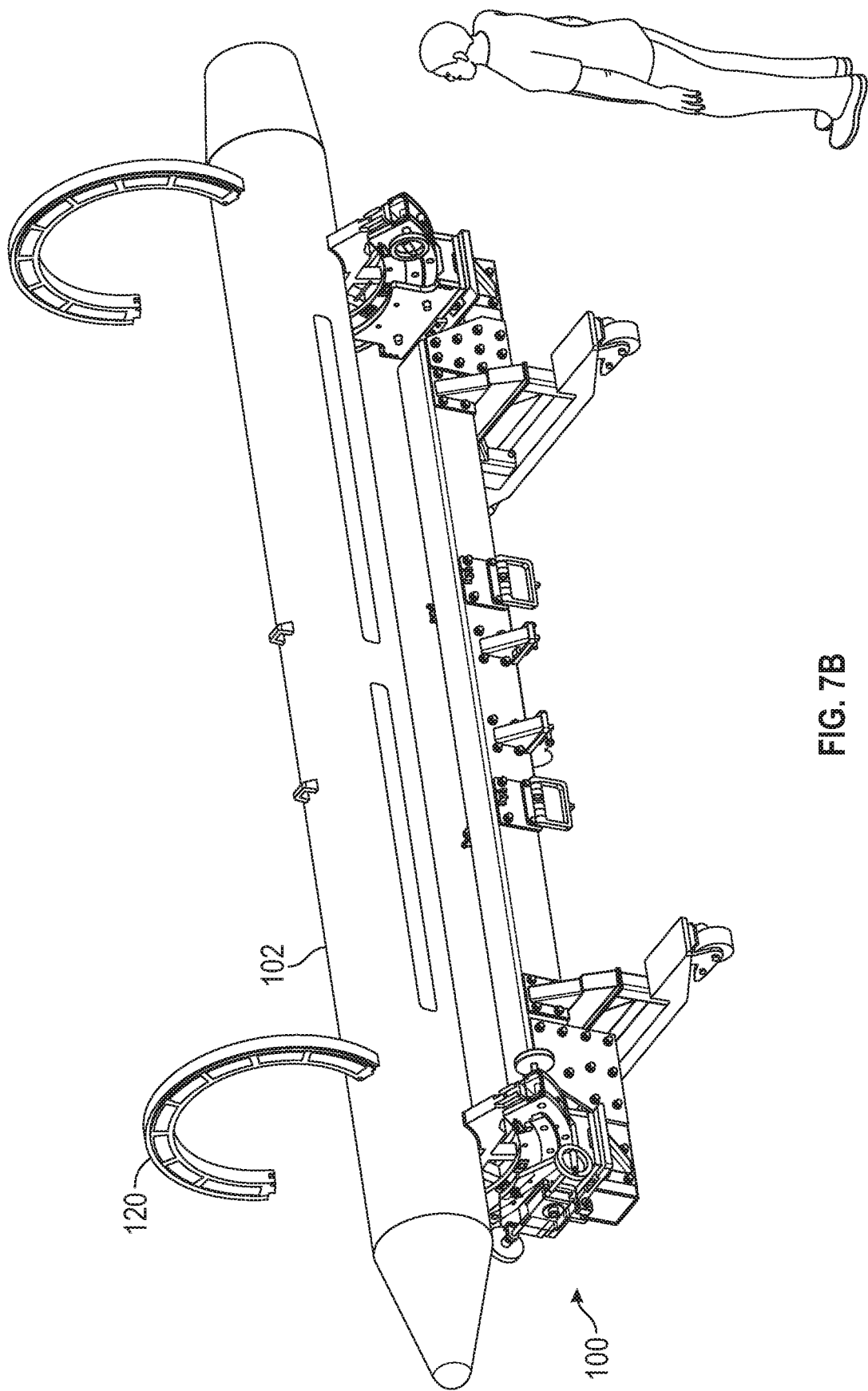
Figure 7C:
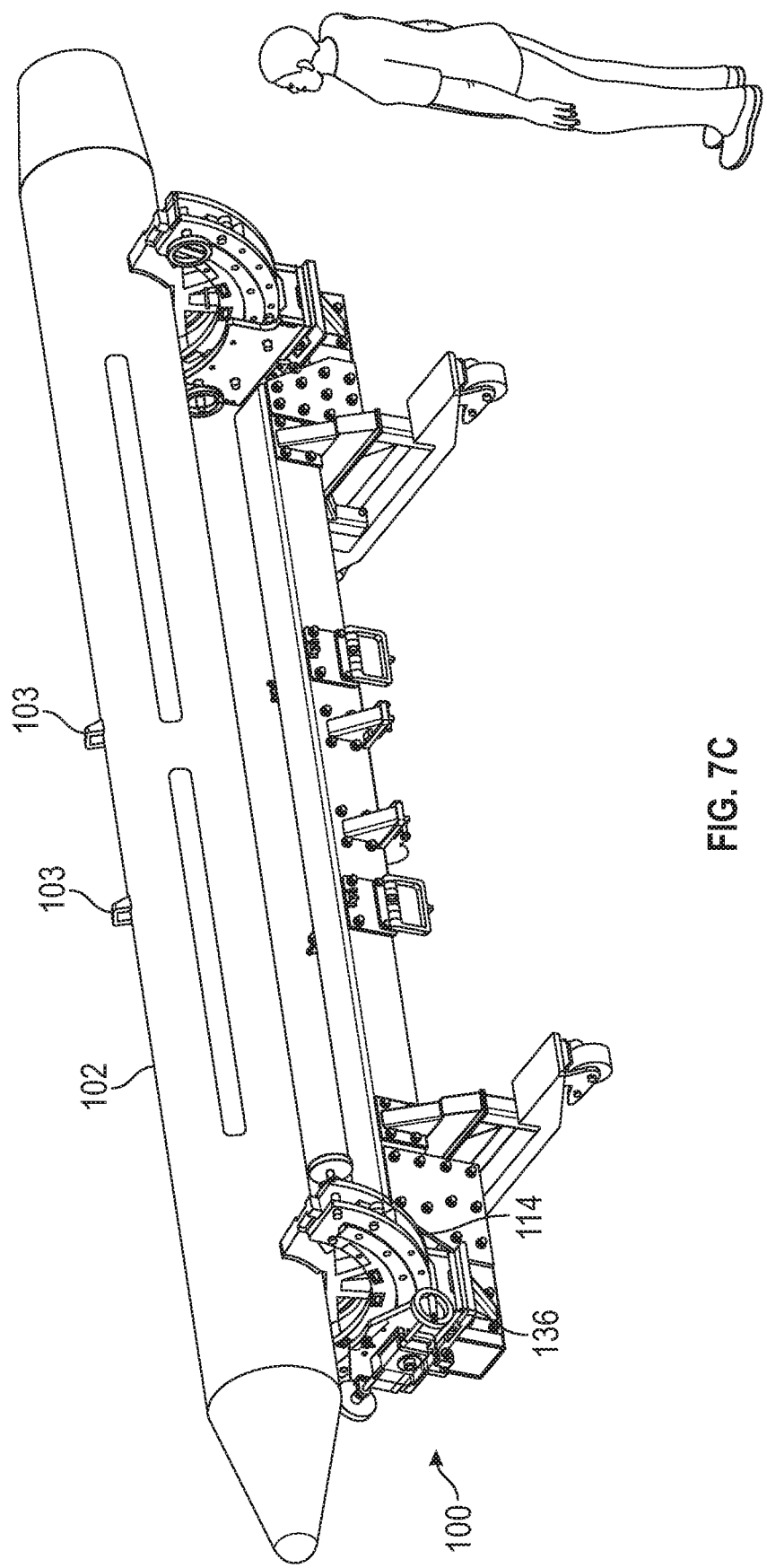
Figure 7D:
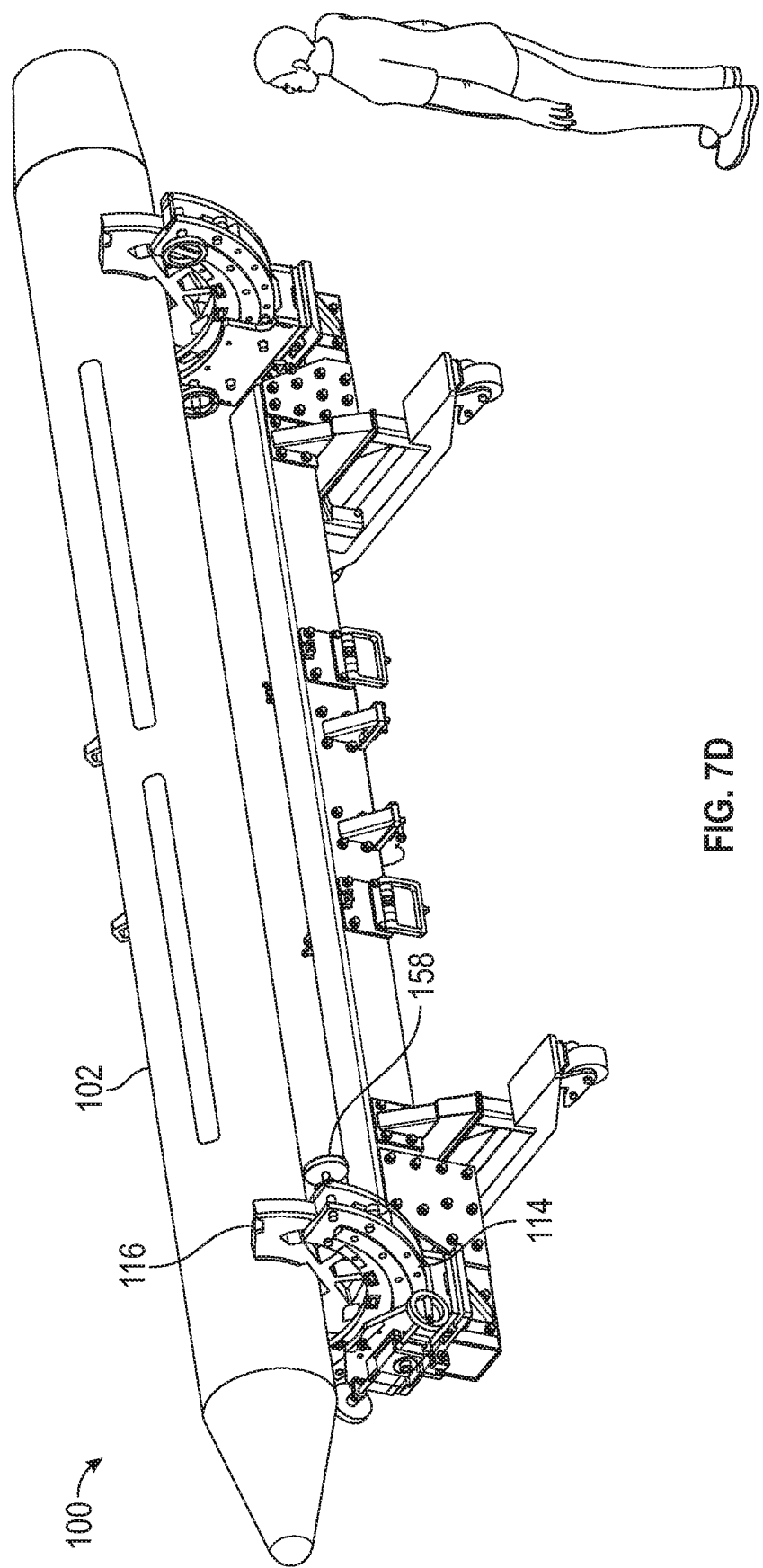
Figure 7E:
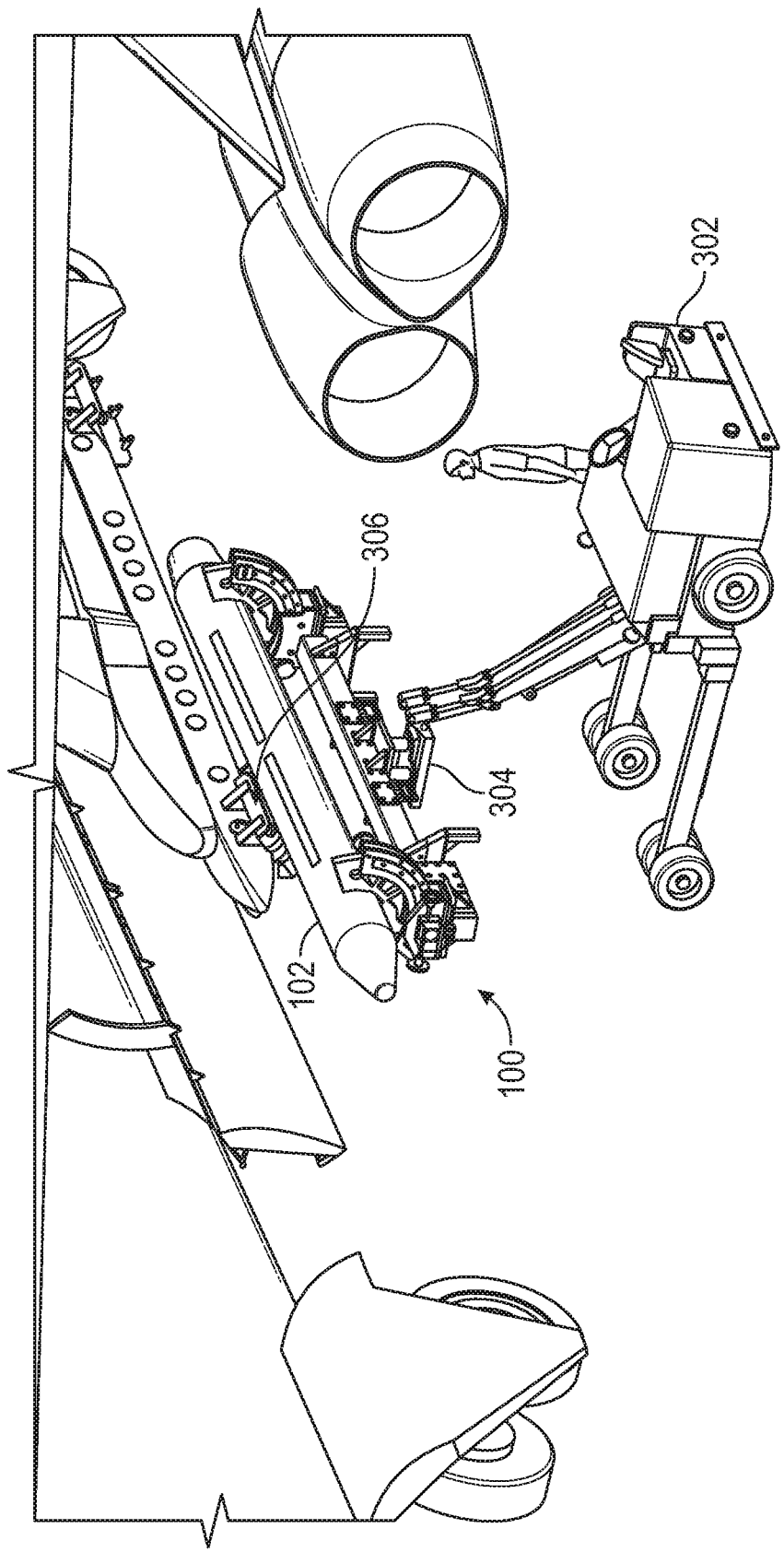

Referring now to FIGS. 7A through 7E, the same Universal Tool 100 is used to rotate the payload 102 over the 360 degree range to allow a user 128 to perform one or more tasks on the payload and then, with the upper ring segment 120 removed, to rotate the telescoping cradle 114 and rotate and extent the lower ring segment 116 from the telescoping cradle 114 over a combined range of rotation to a prescribed angle to load payload 102 onto the aircraft. As shown in FIG. 7A, payload 102 is secured onto the mount on lower ring segment 116, upper ring segment 120 is attached and the user has cranked the hand wheel 158 to rotate the ring to a desired position for performing the task. As shown in FIG. 7B, the lower ring segment 116 is rotated down into the telescoping cradle 114 and the upper ring segment 120 is removed. As shown in FIG. 7C, the user has disengaged quick release pin 142 and cranked the hand wheel 136 to rotate telescoping cradle 114 to the extent of its range. As shown in FIG. 7D, the user has engaged quick release pin 142 to fix the telescoping cradle 114, disengaged quick release pin 149, cranked hand wheel 158 to rotate and extend lower ring segment 116 to the desired orientation and engaged quick release pin 149 to hold the payload at that orientation. As shown in FIG. 7E, a jammer 302 uses an effector 304 to lift the Universal Tool under the wing to position the payload's lugs 103 adjacent to the wing mount 306 to secure the payload to the wing. Critically, because the Universal Tool has rotated the payload 102 to the required orientation to secure the payload the "Positioner" 12 as shown in FIG. 1 is no longer required.

If desired, a Loading Tool or Adapter can be configured by omitting the upper ring segment 120. This would be a direct replacement for the Positioner. With this tool, the Jammer would only be required to lift the assembly, not to tilt the assembly.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A universal tool for rotational manipulation of a payload, said tool comprising:
    a lifting beam; and
    first and second telescoping cradle assemblies positioned fore and aft on the lifting beam, each said telescoping cradle assembly comprising:
        a telescoping cradle rotationally coupled to the lifting beam;
        a lower ring segment captured in the telescoping cradle;
        a payload mount on the lower ring segment; and
        a detachable upper ring segment;
    wherein in a first state a complete ring formed by attachment of the upper ring segment to the lower ring segment rotates to different positions over a first range of rotation of 360 degrees;
    wherein in a second state the telescoping cradle rotates and the lower ring segment rotates and extends from the telescoping cradle over a combined range of rotation.

2. The universal tool of claim 1, wherein a width of the universal tool at 0 degrees rotation of both the telescoping cradle and lower ring segment is less than a specified value, wherein at the specified width neither a second range of rotation of the telescoping cradle or a third range of rotation of the lower ring segment is itself sufficient to reach a minimum required angle of rotation to support unloading the payload from the universal tool.

3. The universal tool of claim 2, wherein the second range of rotation is approximately +/−38 degrees, the third range of rotation is approximately +/−22 degrees and the combined range of rotation is approximately +/−60 degrees.

4. The universal tool of claim 2, wherein the second range of rotation is approximately +/−50 degrees, the third range of rotation is approximately +/−40 degrees and the combined range of rotation is approximately +/−90 degrees.

5. The universal tool of claim 1, wherein the payload comprises a store to be mounted under a wing of an aircraft, wherein said second state the telescoping cradle and lower ring segment rotate and extend to a specified angle to load the store under the wing.

6. The universal tool of claim 1, further comprising:
    a telescoping cradle locking mechanism for locking the telescoping cradle to prevent rotation; and
    a lower ring segment locking mechanism for locking the lower ring segment to the telescoping cradle,
    wherein in the first state said lower ring segment locking mechanism is disengaged,
    wherein once the telescoping cradle and lower ring segment are rotated and extended to a specified angle the telescoping cradle locking mechanism and lower ring segment locking mechanism are engaged.

7. The universal tool of claim 1, further comprising:
    a first drive mechanism configured to rotate the complete ring and payload mount over the first range of rotation 360 degrees in the first state;
    a second drive mechanism configured to rotate the telescoping cradle over a second range of rotation in the second state; and
    a third drive mechanisms configured to rotate and extend the lower ring segment with respect to the telescoping cradle over a third range of rotation,
    wherein said second and third drive mechanisms together rotate the lower ring segment and the payload mount over the combined range of rotation that exceeds each of the second and third ranges of rotation.

8. The universal tool of claim 7, wherein said first and third drive mechanisms are a common drive mechanism.

9. A universal tool for rotational manipulation of a payload, said tool comprising:
    a lifting beam; and
    first and second telescoping cradle assemblies positioned fore and aft on the lifting beam, each said telescoping cradle assembly comprising:
        a lower cradle mounted on the lifting beam;
        a telescoping cradle rotationally captured in the lower cradle, said telescoping cradle forming a portion of a circular ring;
        a telescoping cradle locking mechanism for locking the telescoping cradle to the lower cradle;
        a lower ring segment rotationally captured in the telescoping cradle;
        a lower ring segment locking mechanism for locking the lower ring segment to the telescoping cradle;
        a payload mount positioned on the lower ring segment for attaching the payload;

a detachable upper ring segment that attaches to the lower ring segment to form a complete ring;
a first drive mechanism configured to rotate the complete ring and payload mount over a first range of rotation of 360 degrees when the upper ring segment is attached and the ring locking mechanism is disengaged;
a second drive mechanism configured to rotate the telescoping cradle over a second range of rotation when the upper ring segment is detached, the telescoping cradle locking mechanism is disengaged and the lower ring segment locking mechanism is engaged; and
a third drive mechanism configured to rotate and extend the lower ring segment with respect to the telescoping cradle over a third range of rotation when the upper ring segment is detached, the telescoping cradle locking mechanism is engaged and the lower ring segment locking mechanism is disengaged,
wherein said second and third drive mechanisms together rotate the lower ring segment and the payload mount over a combined range of rotation that exceeds each of the second and third ranges of rotation.

10. The universal tool of claim 9, wherein a width of the universal tool at 0 degrees rotation of both the telescoping cradle and lower ring segment is less than a specified value, wherein at the specified width neither the second range of rotation of the telescoping cradle or the third range of rotation of the lower ring segment is itself sufficient to reach a minimum required angle of rotation to support unloading the payload from the universal tool.

11. The universal tool of claim 10, wherein at a maximum rotation of the telescoping cradle over the second range of rotation, a trailing edge of the telescoping cradle clears an outer edge of the lower cradle.

12. A method of using a universal tool for rotational manipulation of a payload, the method comprising:
mounting a payload onto a universal tool comprising first and second telescoping cradle assemblies positioned fore and aft of a lifting beam, each said telescoping cradle assembly comprising a lower ring segment captured in a telescoping cradle rotationally coupled to the lift beam and a payload mount on the lower ring segment;
to perform a task on the payload,
attaching an upper ring segment to the lower ring segment to form a complete ring; and
rotating the payload to a desired position over a range of rotation of 360 degrees; and
to unload the payload from the universal tool,
detaching the upper ring segment; and
rotating the telescoping cradle and rotating and extending the lower ring segment from the telescoping cradle to a specified angle over a combined range of rotation.

13. The method of claim 12, wherein a width of the universal tool at 0 degrees rotation of both the telescoping cradle and lower ring segment is less than a specified value, wherein at the specified width neither the second range of rotation of the telescoping cradle or the third range of rotation of the lower ring segment is itself sufficient to reach a minimum required angle of rotation for the combined range of rotation.

14. The method of claim 12, further comprising:
to perform the task on the payload, disengaging a lower ring segment locking mechanism; and
to unload the payload, once the telescoping cradle and lower ring segment are rotated and segmented to a specified angle engaging a telescoping cradle locking mechanism and the lower ring segment locking.

15. The method of claim 12, further comprising:
to perform the task on the payload, using a first drive mechanism to rotate the complete ring to the desired position; and
to unload the payload, using a second drive mechanism to rotate the telescoping cradle and the first drive mechanism to rotate and extend the lower ring segment.

16. A loading tool for rotational manipulation of a payload, said tool comprising:
a lifting beam; and
first and second telescoping cradle assemblies positioned fore and aft on the lifting beam, each said telescoping cradle assembly comprising:
a telescoping cradle rotationally coupled to the lifting beam;
a lower ring segment captured in the telescoping cradle;
a payload mount on the lower ring segment;
one or more drive mechanisms configured to rotate the telescoping cradle and rotate and extend the lower ring segment from the telescoping cradle to a specified angle over a combined range of rotation; and
a locking mechanism configured to fix the angle of rotation at the specified angle for unloading the payload.

17. The loading tool of claim 16, wherein a width of the universal tool at 0 degrees rotation of both the telescoping cradle and lower ring segment is less than a specified value, wherein at the specified width neither a first range of rotation of the telescoping cradle or a second range of rotation of the lower ring segment is itself sufficient to reach a minimum required specified angle to support unloading the payload from the universal tool.

18. The loading tool of claim 17, wherein the payload comprises a store to be mounted under a wing of an aircraft, wherein said second state the telescoping cradle and lower ring segment rotate and extend to a specified angle to load the store under the wing, wherein the second range of rotation is approximately +/−38 degrees, the third range of rotation is approximately +/−22 degrees and the combined range of rotation is approximately +/−60 degrees.

19. The loading tool of claim 16, wherein the locking mechanism comprises:
a telescoping cradle locking mechanism for locking the telescoping cradle to prevent rotation; and
a lower ring segment locking mechanism for locking the lower ring segment to the telescoping cradle,
wherein once the telescoping cradle and lower ring segment are rotated and segmented to the specified angle the telescoping cradle locking mechanism and lower ring segment locking mechanism are engaged.

20. The loading tool of claim 16, further comprising:
a first drive mechanism configured to rotate the telescoping cradle over a second range of rotation in the second state; and
a second drive mechanisms configured to rotate and extend the lower ring segment with respect to the telescoping cradle over a second range of rotation,
wherein said first and second drive mechanisms together rotate the lower ring segment and the payload mount over the combined range of rotation that exceeds each of the first and second ranges of rotation.

* * * * *

UNITED STATES PATENT AND TRADEMARK OFFICE
CERTIFICATE OF CORRECTION

| | | |
|---|---|---|
| PATENT NO. | : 11,912,437 B2 | Page 1 of 1 |
| APPLICATION NO. | : 17/089475 | |
| DATED | : February 27, 2024 | |
| INVENTOR(S) | : Grizzle et al. | |

It is certified that error appears in the above-identified patent and that said Letters Patent is hereby corrected as shown below:

In the Specification

In Column 5, Line 32, delete "pinon" and insert --pinion-- therefor

In Column 6, Line 14, delete "pinon" and insert --pinion-- therefor

In Column 6, Line 22, delete "114" and insert --116-- therefor

Signed and Sealed this
Seventeenth Day of December, 2024

Derrick Brent
*Acting Director of the United States Patent and Trademark Office*